US006934868B2

(12) United States Patent
Morrison et al.

(10) Patent No.: US 6,934,868 B2
(45) Date of Patent: Aug. 23, 2005

(54) METHOD AND SYSTEM IN A CLIENT COMPUTER SYSTEM FOR GENERATING AND DISPLAYING A LOCAL SERVER CLOCK SYNCHRONIZED WITH A SERVER CLOCK USING A CLIENT CLOCK

(75) Inventors: William James Morrison, Gilmanton, NH (US); Rebecca Lynn Roberts, Austin, TX (US); Susan Schlichter Ruyle, Austin, TX (US); Leland James Wiesehuegel, Austin, TX (US); William K. Wittenbrook, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 970 days.

(21) Appl. No.: 09/751,247

(22) Filed: Dec. 29, 2000

(65) Prior Publication Data

US 2002/0087731 A1 Jul. 4, 2002

(51) Int. Cl.[7] .................................................. G06F 1/12
(52) U.S. Cl. ........................ 713/500; 713/400; 713/600; 705/26; 705/27; 709/217; 709/227; 709/228; 709/248
(58) Field of Search ................................. 713/400, 500, 713/600; 705/26, 27, 10, 37; 709/217, 227, 228, 248, 200, 201, 230–232, 400

(56) References Cited

U.S. PATENT DOCUMENTS 5,758,137 A      5/1998   Armstron, Jr. et al. ..... 395/557

| | | | | |
|---|---|---|---|---|
| 5,790,805 A | * | 8/1998 | Bantum | 709/248 |
| 5,826,185 A | | 10/1998 | Wise et al. | 455/405 |
| 6,023,769 A | * | 2/2000 | Gonzalez | 713/400 |
| 6,041,342 A | | 3/2000 | Yamaguchi | 709/202 |
| 6,044,258 A | | 3/2000 | Abdella | 455/405 |
| 6,058,417 A | * | 5/2000 | Hess et al. | 709/219 |
| 6,134,531 A | * | 10/2000 | Trewitt et al. | 705/10 |
| 6,144,727 A | * | 11/2000 | Mashinsky | 379/114.02 |
| 6,192,007 B1 | * | 2/2001 | Aoshima | 368/10 |
| 6,771,990 B1 | * | 8/2004 | Nilsson | 455/566 |
| 2002/0016743 A1 | * | 2/2002 | Dorr | 705/26 |
| 2002/0087456 A1 | * | 7/2002 | Abeshouse et al. | 705/37 |
| 2004/0059646 A1 | * | 3/2004 | Harrington et al. | 705/27 |
| 2004/0073718 A1 | * | 4/2004 | Johannessen et al. | 709/400 |

* cited by examiner

*Primary Examiner*—Lynne H. Browne
*Assistant Examiner*—Nitin C. Patel
(74) *Attorney, Agent, or Firm*—Duke W. Yee; David A. Mims, Jr.; Theodore D. Fay, III

(57) ABSTRACT

A data processing system and method are disclosed for generating and displaying a local server clock which is synchronized with a server clock using a client clock. The data processing system includes a server computer system, which includes a server clock, and a client computer system, which includes a display and a client clock. Data is requested by the client from the server computer system to be displayed on the client computer system's display. The data is then received in the client computer system. The client computer system determines a current time indicated by the server clock. The client computer system generates a local server clock. Thereafter, the local server clock is updated utilizing the client clock. The local server clock and the data are then displayed together on the client's display.

12 Claims, 8 Drawing Sheets

METHOD AND SYSTEM IN A CLIENT COMPUTER SYSTEM FOR GENERATING AND DISPLAYING A LOCAL SERVER CLOCK SYNCHRONIZED WITH A SERVER CLOCK USING A CLIENT CLOCK

BACKGROUND OF THE INVENTION

1. Field of the Invention

The present invention relates generally to data processing systems and more particularly to networked computer systems. Still more particularly, the present invention relates to a client computer system which generates and displays a local server clock which is synchronized with a server clock using a client clock.

2. Description of the Related Art

In typical data processing systems, a client computer system may be coupled to an Internet server computer system. The client may request data from the server which the server then transmits to the client, often in the form of Web pages. When the client receives a Web page, the data displayed on a page is static. The data is not dynamically updated from the server as the server receives updates to the data. Therefore, the data displayed on a client may become quickly outdated.

A frequently utilized service provided by an Internet server is an auction service. The auction service may list an item to be auctioned. The length of time the server will accept bids on a particular item is limited and ends at a predetermined date and time. The predetermined date and time are calculated utilizing the time indicated by the server clock. The server may be located physically far away from a client which accesses the server. For example, the server may be located in one time zone while the client resides in another, different time zone. This creates the need for a user to perform a calculation as to the length of time the auction will be open.

In addition, it may be advantageous to a potential buyer to wait until the last minutes of an auction before submitting a bid. In this case, the buyer must calculate precisely when an auction closes. Because the internal clocks of different computer systems are not synchronized, this calculation can become tedious possibly resulting in a lost bidding opportunity when the auction closes earlier than the potential buyer had calculated.

Therefore, a need exists for a method and system for generating and displaying a local server clock which is synchronized with a server clock using a client clock from which various counter values may be derived and displayed. A need exists to indicate to a user how long it has been since the data being viewed has been refreshed, or updated.

SUMMARY OF THE INVENTION

A data processing system and method are disclosed for generating and displaying a local server clock which is synchronized with a server clock using a client clock. The data processing system includes a server computer system, which includes a server clock, and a client computer system, which includes a display and a client clock. Data is requested by the client from the server computer system to be displayed on the client computer system's display. The data is then received in the client computer system. The client computer system determines a current time indicated by the server clock. The client computer system generates a local server clock. Thereafter, the local server clock is updated utilizing the client clock. The local server clock and the data are then displayed together on the client's display.

The above as well as additional objectives, features, and advantages of the present invention will become apparent in the following detailed written description.

BRIEF DESCRIPTION OF THE DRAWINGS

The following detailed description when taken in conjunction with the figures presented herein provide a complete disclosure of the invention.

DETAILED DESCRIPTION OF THE INVENTION

Figure 1:
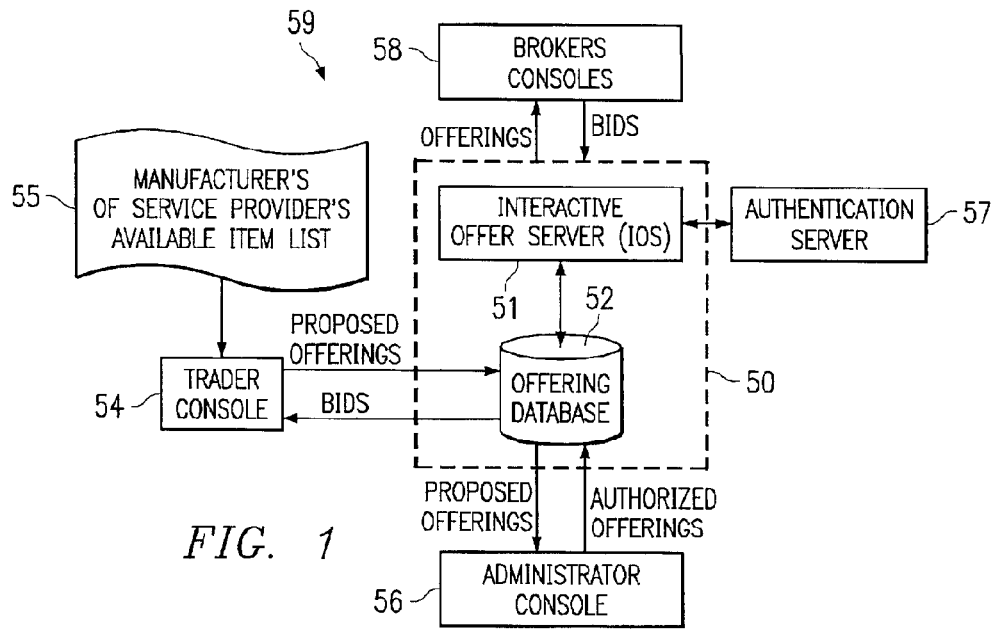
FIG. 1 depicts a general architecture of an Interactive Offer Server ("IOS") in which the present invention may be implemented.

The present method and system is preferably realized in a plurality of networked computers, including computer network terminals or consoles, networked database application servers, web servers, and a computer network. The computer network consoles employed are any suitable device for accessing remote application services over a computer network, including, but not limited to: personal computer-based web browsers, wireless web browsers such as web-enabled wireless telephones and personal digital assistants ("PDA"), Internet appliances, and dedicated computer terminals. The database application servers employable in the invention may be any of a wide array of available database application servers, including, but not limited to: IBM Lotus Notes servers, Oracle servers, etc. The web servers incorporated into the invention may be any suitable platform, including, but not limited to: IBM's WebSphere product, Apache Hyper Text Transfer Protocol ("HTTP")

servers, secure HTTP servers ("HTTPS"), and the like. The computer network may include the Internet, intranets, extranets, dedicated networks such as local area networks ("LAN") and wide area networks ("WAN"), wireless data networks, and/or any other suitable computer and data communications network. Communications means between database application servers, computer network consoles, and web servers may include any suitable data communications protocols and media including, but not limited to: dial-up modems over telephone lines, wireless data transceivers, cable modems, Digital Subscriber Lines ("DSL"), and dedicated data communication lines.

It will be recognized by those skilled in the art that certain combinations and integrations of the features presented herein may be made without departing from the spirit and scope of the invention. Further, it will be recognized that many of the architectural details disclosed herein are disclosed under the inventor's preferred embodiment in order to enhance the robustness and reliability of the invention, but these details may not be necessary to realize the fundamental functionality of the invention.

The present invention is method and system for a client computer system generating and displaying a local server clock which is synchronized with a server clock utilizing a client clock. The client is coupled to a server. The client includes the client clock, and the server includes the server clock. The local server clock is generated within the client to be synchronized with the server clock.

Data may be requested by the client from the server. For example, the client may request that the server transmit a particular Web page to the client. When the client requests the Web page from the server, the client can also access the server clock to determine the current time indicated by the server clock. The client first sets a local server clock to the current time of the server clock.

When setting the local server clock, the client must determine the amount of network delay which occurred after the client transmitted a request to obtain the current time indicated by the server clock and before the server clock time was returned to the client. There are several methods currently known in the art which may be used to determine this network delay. Any suitable method may be utilized to determine network delay.

In accordance with the present invention, the local server is set equal to the time returned to the client in response to the client's request for the time plus the network delay. Thereafter, the local server clock is incremented and controlled only by the client using the client clock. In this manner, the client is capable of determining a very close approximation of the time currently indicated by the server clock without subsequently accessing the server clock.

Once the local server clock is set and indicating an approximation of the time indicated by the server clock, the local server clock may be utilized to provide time-sensitive information to the user. For example, an auction item may be displayed on the requested Web page. An auction item typically includes a date and time when the auction for the item will close such that no other bids will be accepted. The local server clock may be used to calculate the time remaining before the auction closes.

An icon is associated and displayed for each item being auctioned. When an icon is selected, a window is displayed. A time-remaining counter is provided which indicates the amount of time remaining before the auction for the associated item closes. The remaining time is calculated utilizing the local server clock and the date and time when the auction closes. The time-remaining counter is decremented utilizing the client clock.

In addition, a time-remaining parameter may be provided by a user. For example, user preferences may be obtained utilizing a user preferences screen where each user could specify the parameter. For some users the parameters may be any number of days. Other user could select a shorter time. If the time remaining before the auction closes is greater than the parameter, a statement will be displayed in the window which states that the remaining time is greater than the value of the parameter. If, however, the time remaining is less than the parameter, the current value of the time-remaining counter will be displayed. When the window is closed, the time-remaining counter is stopped.

The time-remaining display is an absolute time. For example, the display may indicate that there are more than a particular number of days left for the auction. Or, the display may indicate that the auction will close in 47 minutes. The time remaining is not dependent on time zones. Therefore, the potential buyer does not need to made any calculations to determine how soon close the auction will close.

Frequently it is useful to know how much time has passed since the Web page was refreshed. To provide this feature, a refresh counter is provided within the client. When a Web page is received, a refresh counter is reset to zero and then started incrementing. The increments of the counter are controlled by the client clock. The refresh counter is displayed on the page. When the Web page is refreshed, by receiving updated information from the server, the refresh counter is again reset to zero and then incremented utilizing the client clock. In this manner, a user can immediately determine how much time has passed since the data displayed on the Web page was updated.

Turning to FIG. 1, in which the general architecture of the system of the invention is shown, an Interactive Offer Server ("IOS") 51 is associated with an offering database 52. The offering system 50 is included in the larger architecture 59 which includes the brokers' consoles 58, the administrator console 56, and the traders' consoles 54. All consoles and the interactive offering server may communicate either as an integrated package within one computer system, or as separate computer systems integrated and communicating over a computer network such as the Internet.

In the general architecture of FIG. 1, the manufacturer or service provider's goods availability list 55 is received by the trader consoles 54. The trader then creates proposed offerings by filtering the availability list against the broker profile matrices 40 for his broker(s). Those proposed offerings are input into the offering data base 52, which are then retrieved by the administrator using his administrator console 56.

The administrator then authorizes the proposed offerings and makes a note or change in the offering data base records to indicate such authorization.

During the open bidding process, the brokers may use their consoles, such as web browser personal computers 58, to retrieve their offerings, and to submit bids via the IOS 51. When a broker makes contact with the interactive offering server, his identity is first verified by an Authentication Server 57, according to the preferred embodiment.

In response to the broker's request for products or services offerings, the IOS queries the offering database 52 and presents the broker with offerings to which he or she is entitled. An authentication server 57 is included in the preferred embodiment so as to allow the interactive offering server to authenticate the broker prior to presenting any offerings to the broker. As such, the general architecture 59 as shown in FIG. 1 provides each broker with one or more offerings which have been authorized and which have been filtered only to show available materials or services on which he is entitled to bid.

Figure 2:
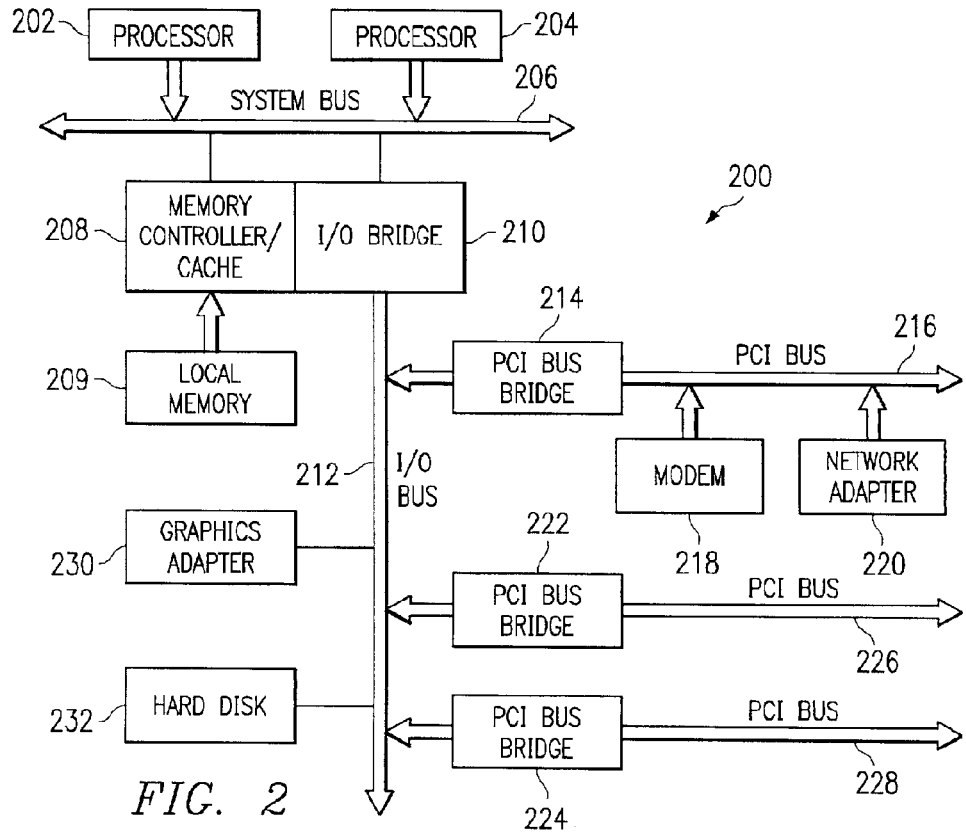
FIG. 2 is an exemplary block diagram of a server according to the present invention.

FIG. 2 illustrates a block diagram of a data processing system which may be implemented as IOS server 51 in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to other network computers may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, New York, running the Advanced Interactive Executive (AIX) operating system.

Figure 3:
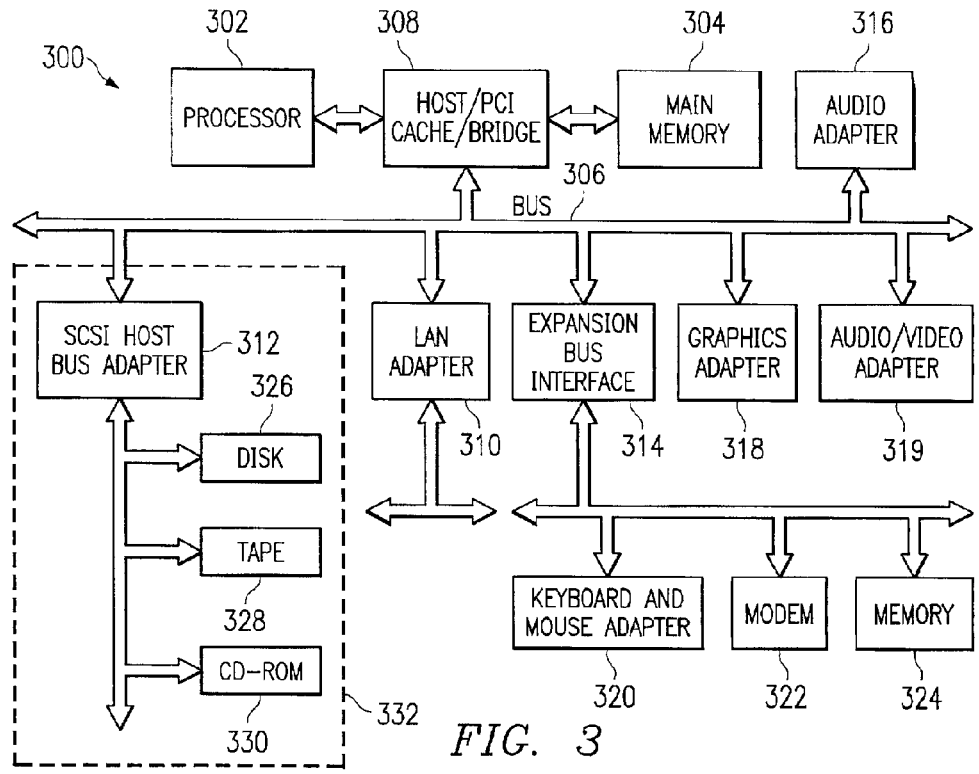
FIG. 3 is an exemplary block diagram of a client according to the present invention.

FIG. 3 depicts a block diagram which illustrates a data processing system which may be implemented as one or more broker consoles 58. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
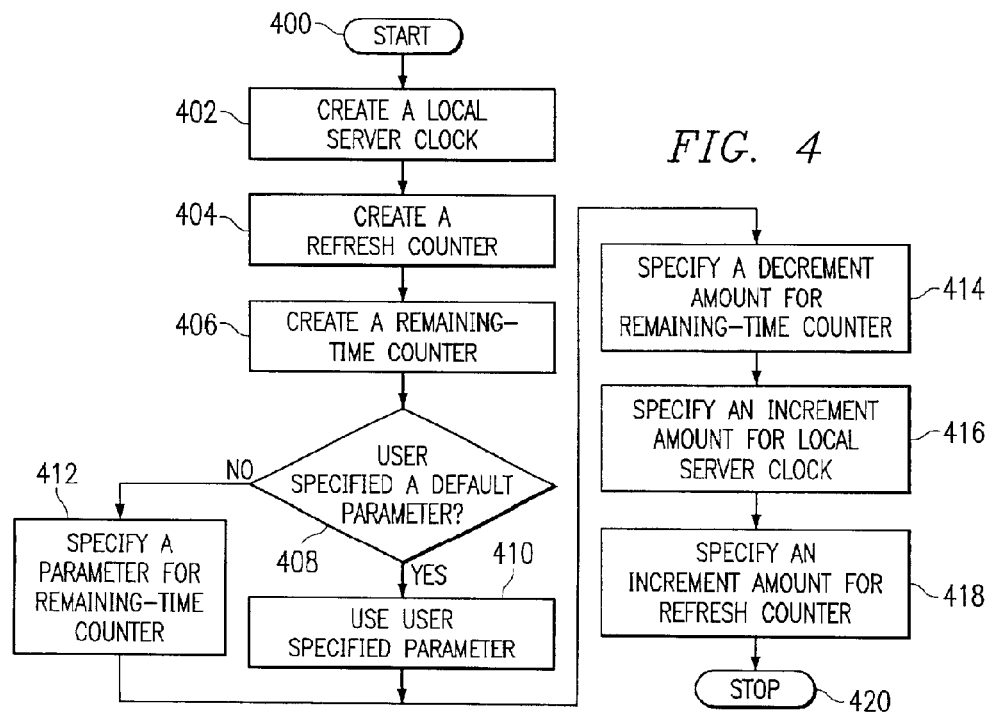
FIG. 4 illustrates a high level flow chart which depicts creating a local server clock and counters in a client according to the present invention.

FIG. 4 illustrates a high level flow chart which depicts creating a local server clock and counters in a client according to the present invention. The process starts as depicted by block 400 and thereafter passes to block 402 which illustrates the creation of a local server clock in a client, such as client 300. The local server clock is preferably implemented as a software variable in the client which is updated utilizing the client's clock in order to increment the variable. Thereafter, block 404 depicts the creation of a refresh counter in the client. Next, block 406 illustrates the creation of a remaining-time counter in the client. Thereafter, block 408 depicts a determination of whether or not a user specified default parameter has been specified. If a determination is made that a user specified default parameter has not been specified, the process passes to block 412 which illustrates the specification of a parameter for the remaining-time counter. This parameter will be used to determine whether to display the actual remaining time, or whether to display a single statement which indicates that the remaining time is greater than a particular value. The process then passes to block 414.

Referring again to block 408, if a determination is made that a user has specified a default parameter, the process passes to block 410 which depicts using the user specified default parameter. The process then passes to block 414.

Block 414 illustrates the specification of a decrement amount for the remaining-time counter which will be used to decrement the remaining-time counter. For example, the remaining-time counter could be decremented each minute or each second. Preferably, the decrement amount for the remaining-time counter will be set equal to one second. The process then passes to block 416 which depicts the specification of an increment amount which will be used to increment the local server clock. For example, the local server clock could be incremented each minute or each second. Preferably, the increment amount will be set equal to one second so that the local server clock is incremented every second. Next, block 418 illustrates the specification of an increment amount for the refresh counter used to increment the refresh counter. For example, the refresh counter could be incremented each minute or each second. Preferably, the refresh counter will be set equal to one second so that the local server clock is incremented every second. The process then terminates as depicted by block 420.

Figure 5:
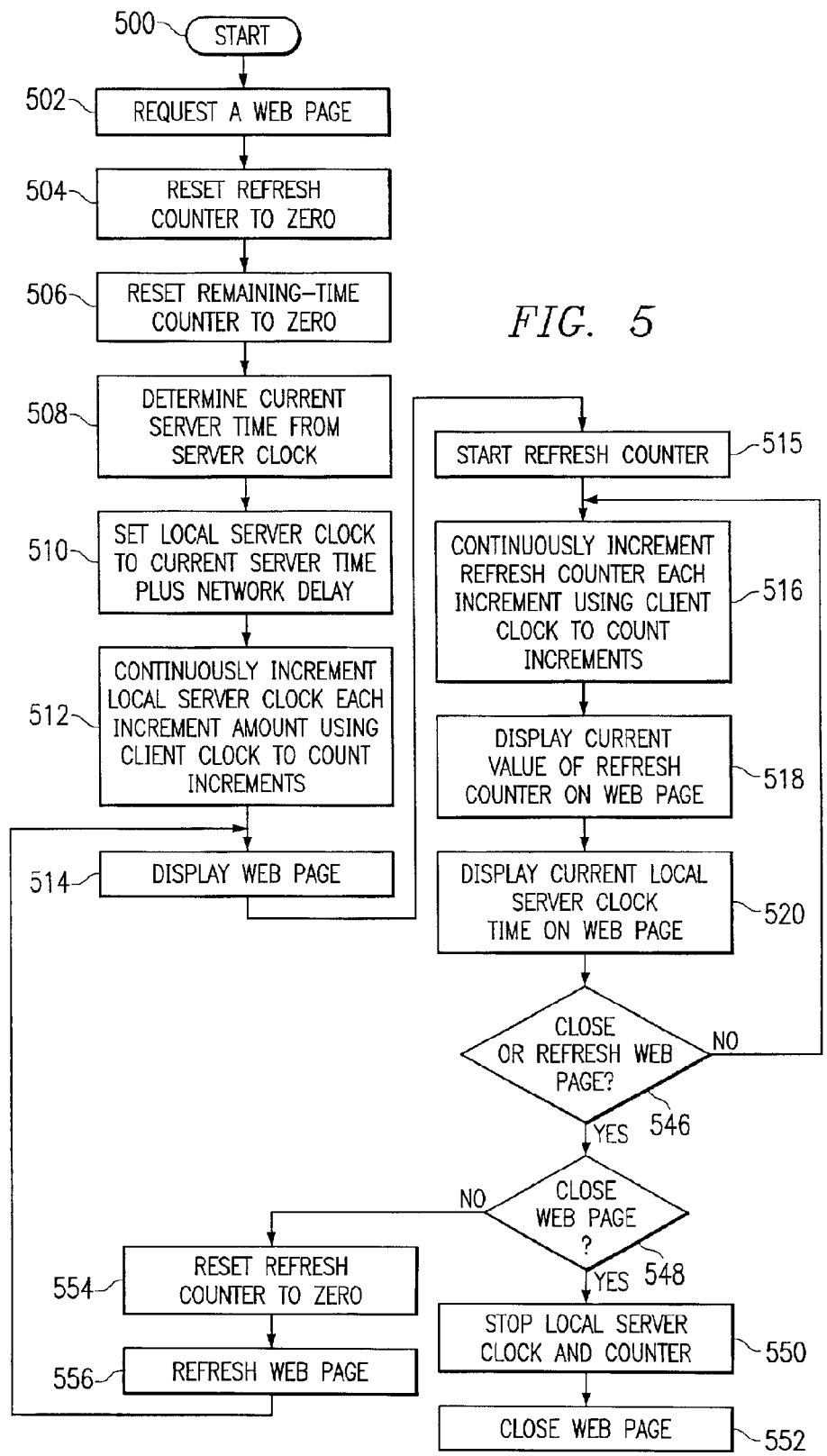
FIG. 5 depicts a high level flow chart which illustrates synchronizing the display of a local server clock with a server clock utilizing a client clock in accordance with the present invention.

FIG. 5 depicts a high level flow chart which illustrates synchronizing the display of a local server clock with a server clock utilizing a client clock in accordance with the present invention. The process starts as depicted by block 500 and thereafter passes to block 502 which illustrates the request by a client of a Web page from a server. Next, block 504 depicts resetting the refresh counter to zero. Thereafter, block 506 illustrates resetting the remaining-time counter to zero. The process then passes to block 508 which depicts the client computer system accessing the server computer system to determine the time currently indicated by the server clock. Therefore, the client reads the server clock to determine the current server time.

Next, block 510 illustrates setting the local server clock variable equal to the current server time plus the network delay. The local server clock variable is implemented in software in the client, and will be referred to herein as the local server clock. Thereafter, block 512 depicts continuously incrementing the local server clock each specified increment amount using the client clock to count the increments. When the increment amount for updating the local server clock is set at one second, the local server clock will be incremented each second. A second will be determined using the client clock. In this manner, the local server clock will display a time which is approximately the same time currently kept on the server by the server's clock. Block 514, then, depicts displaying the Web page on the client.

The process then passes to block 515 which illustrates starting the refresh counter. Block 516, then, depicts continuously incrementing the counter each increment using the client clock to count the increments. Therefore, if the refresh counter increment amount is one second, the refresh counter will increment each second. Next, block 518 depicts displaying the current value of the refresh counter on the displayed Web page. Thereafter, block 520 illustrates displaying the current local server clock time on the displayed Web page. The process then passes to block 546.

Block 546 illustrates a determination of whether or not the Web page is to be closed or refreshed. If a determination is made that the Web page is not to be either closed or refreshed, the process passes back to block 515. Referring again to block 546, if a determination is made that the Web page is to be either closed or refreshed, the process passes to block 548 which depicts a determination of whether or not the Web page is to be closed. If a determination is made that the Web page is to be closed, the process passes to block 550 which illustrates stopping the local sever clock and the refresh counter. Next, block 552 depicts closing the Web page.

Referring again to block 548, if a determination is made that the Web page is not to be closed, the process passes to block 554 which illustrates resetting the refresh counter to zero. Thereafter, block 556 depicts refreshing the Web page. The process then passes back to block 514.

Figure 6:
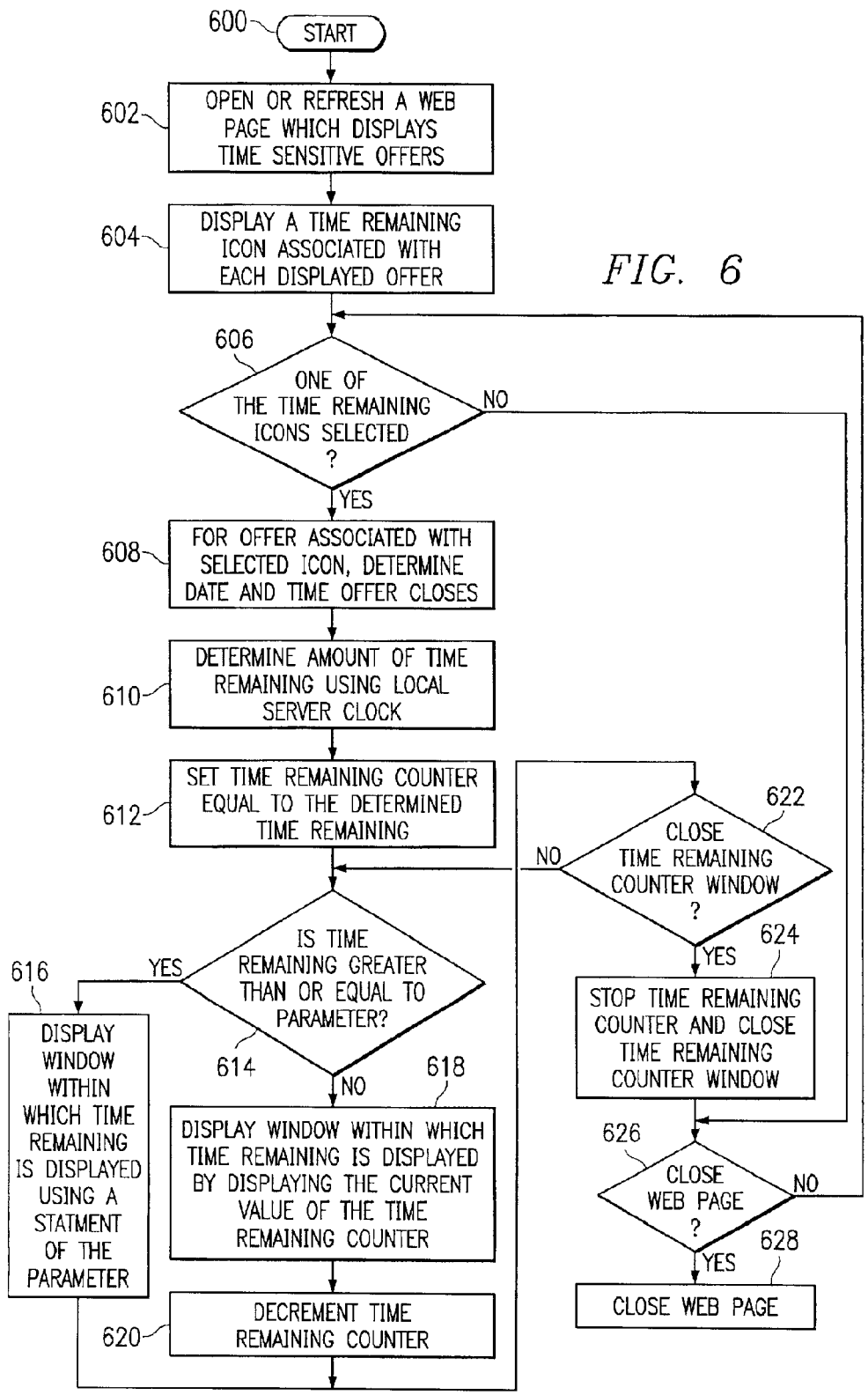
FIG. 6 illustrates a high level flow chart which depicts the creation and utilization of a time remaining counter in accordance with the present invention.

FIG. 6 depicts a high level flow chart which depicts the creation and utilization of a time remaining counter in accordance with the present invention. The process starts as illustrated by block 600 and thereafter passes to block 602 which depicts opening or refreshing a Web page which displays time-sensitive offers. Next, block 604 illustrates displaying a different time remaining icon associated with each displayed offer. Thereafter, block 606 depicts a determination of whether or not one of the time remaining icons has been selected. If a determination is made that none of the time remaining icons have been selected, the process passes to block 626.

Referring again to block 606, if a determination is made that one of the time remaining icons has been selected, the process passes to block 608 which illustrates determining the date and time the offer closes which is associated with the selected icon. Next, block 610 depicts determining the amount of time remaining until the offer closes using the local server clock. Thereafter, block 612 illustrates setting the time-remaining counter equal to the time remaining which was determined as depicted by block 610. Block 614, then depicts a determination of whether or not the time currently remaining until the offer closes is greater than or equal to the time-remaining parameter. If a determination is made that the time currently remaining is greater than or equal to the parameter, the process passes to block 616 which illustrates displaying a window within which the time currently remaining is displayed using a statement of the parameter. For example, if the parameter is set at seven days and the time currently remaining is greater than or equal to seven days, block 616 depicts displaying a statement in the window which states that the current time remaining is greater than seven days. The process then passes to block 622.

Referring again to block 614, if a determination is made that the time currently remaining is less than the parameter, the process passes to block 618 which illustrates displaying a window within which the time currently remaining is displayed by displaying the current value of the time-remaining counter. Next, block 620 depicts decrementing the time remaining counter each decrement amount. Thereafter, block 622 illustrates a determination of whether or not the time remaining window is to be closed. If a determination is made that the time remaining window is not to be closed, the process passes back to block 614. Referring again to block 622, if a determination is made that the time remaining window is to be closed, the process passes to block 624 which depicts stopping the time remaining counter and closing the time remaining counter window. The process then passes to block 626.

Block 626 illustrates a determination of whether or not this Web page is to be closed. If a determination is made that this Web page is not to be closed, the process passes to block 606. Referring again to block 626, if a determination is made that this Web page is to be closed, the process passes to block 628 which illustrates closed this Web page.

Figure 7:
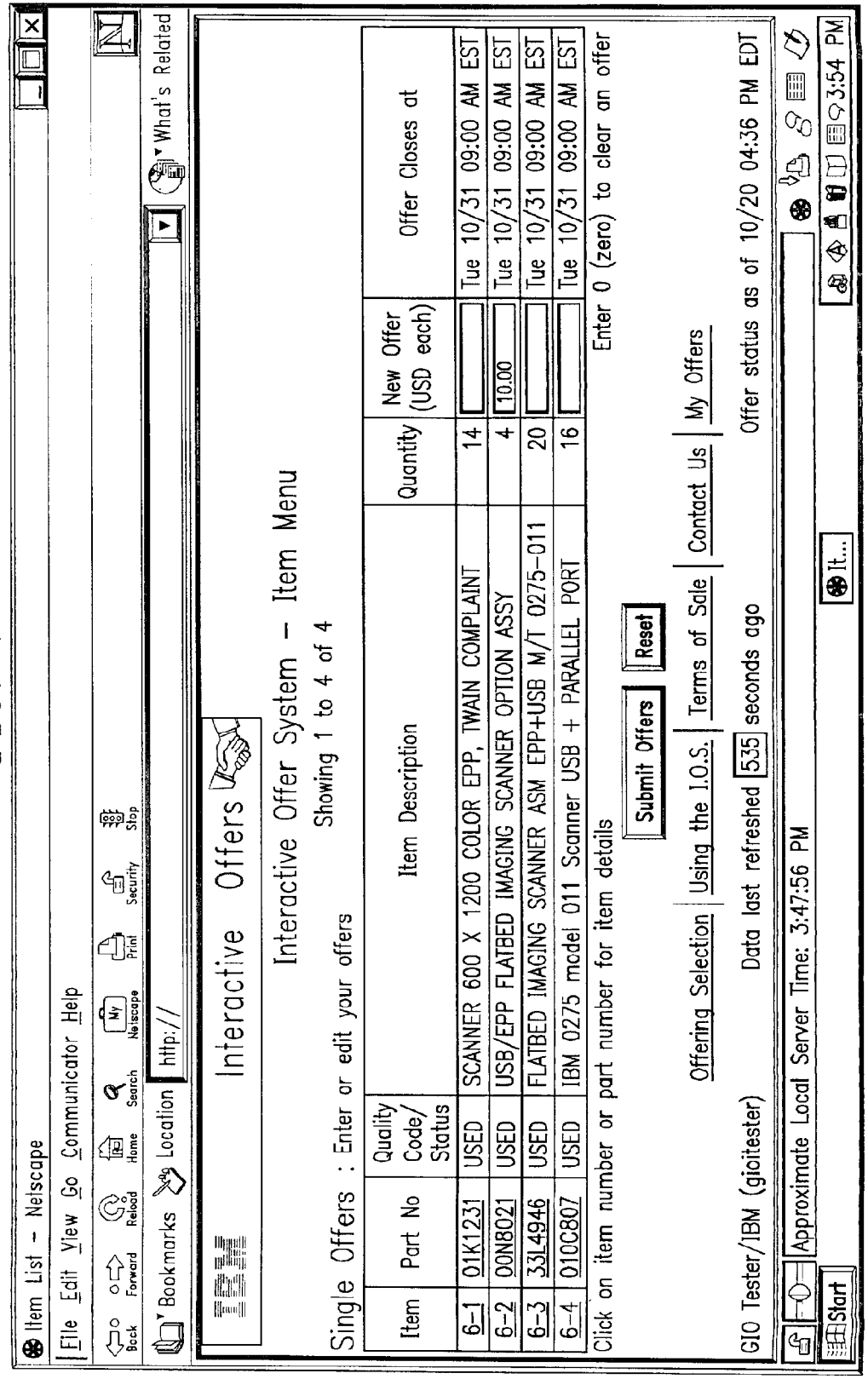
FIG. 7 depicts a screen image within which a local server clock and a refresh counter is illustrated in accordance with the present invention.

FIG. 7 depicts a screen image within which a local server clock and a refresh counter is illustrated in accordance with the present invention. The local server clock currently indicates the server time being 3:47:56 p.m. The refresh counter indicates that the data displayed in this page was last updated 535 seconds ago.

Figure 8:
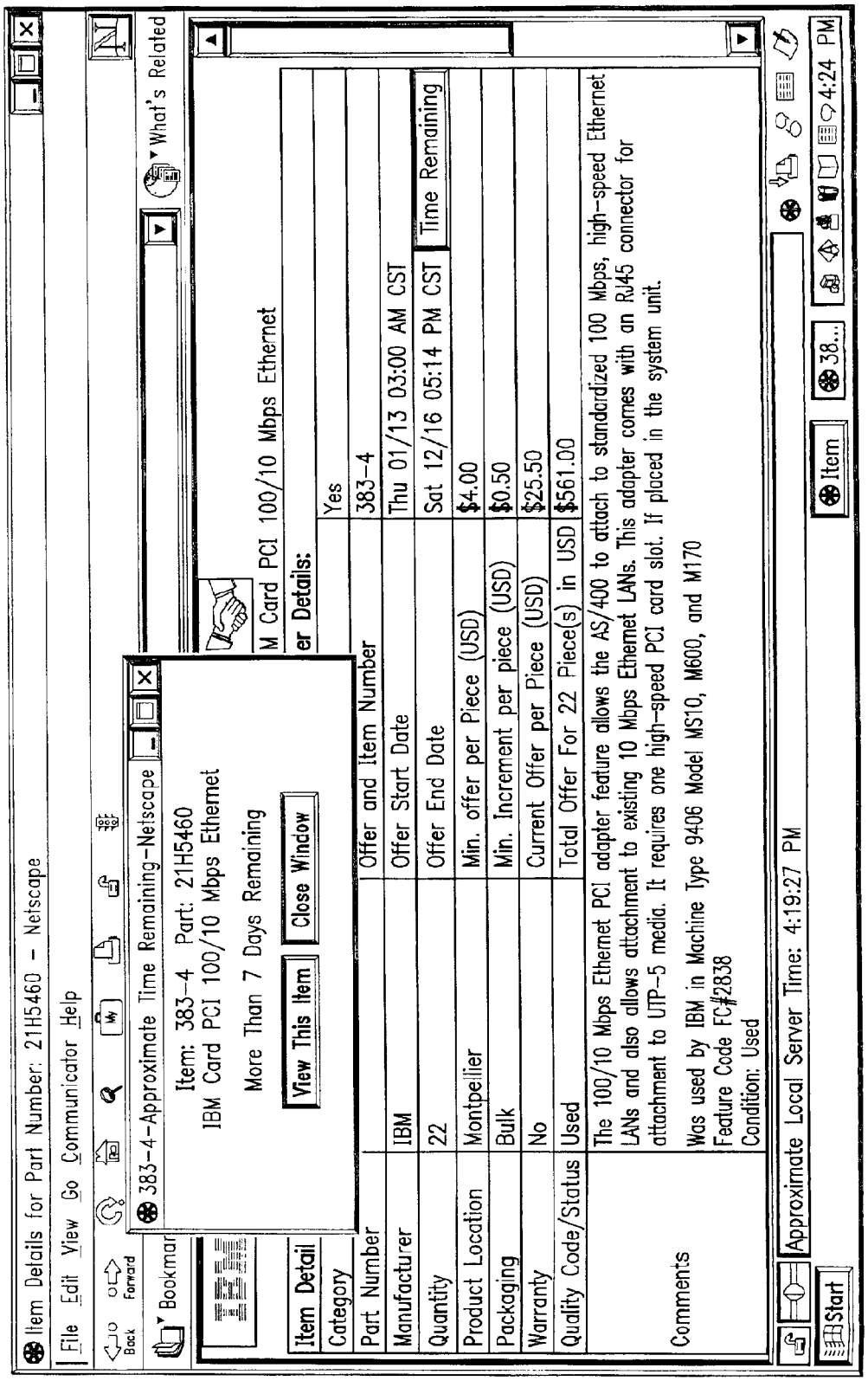
FIG. 8 illustrates a screen image within which a local server clock and a time remaining icon and its associated time remaining counter is illustrated when the time remaining is greater than a specified parameter in accordance with the present invention.

FIG. 8 illustrates a screen image within which a local server clock and a time remaining icon and its associated time remaining counter is illustrated when the time remaining is greater than a specified parameter in accordance with the present invention. The local server clock currently indicates the server time being 4:19:27 p.m. The time remaining icon has been selected and a time remaining window is displayed. The parameter is currently set at 7 days. Therefore, the time remaining before the close of the associated offer is more than 7 days. A single statement is therefore displayed.

Figure 9:
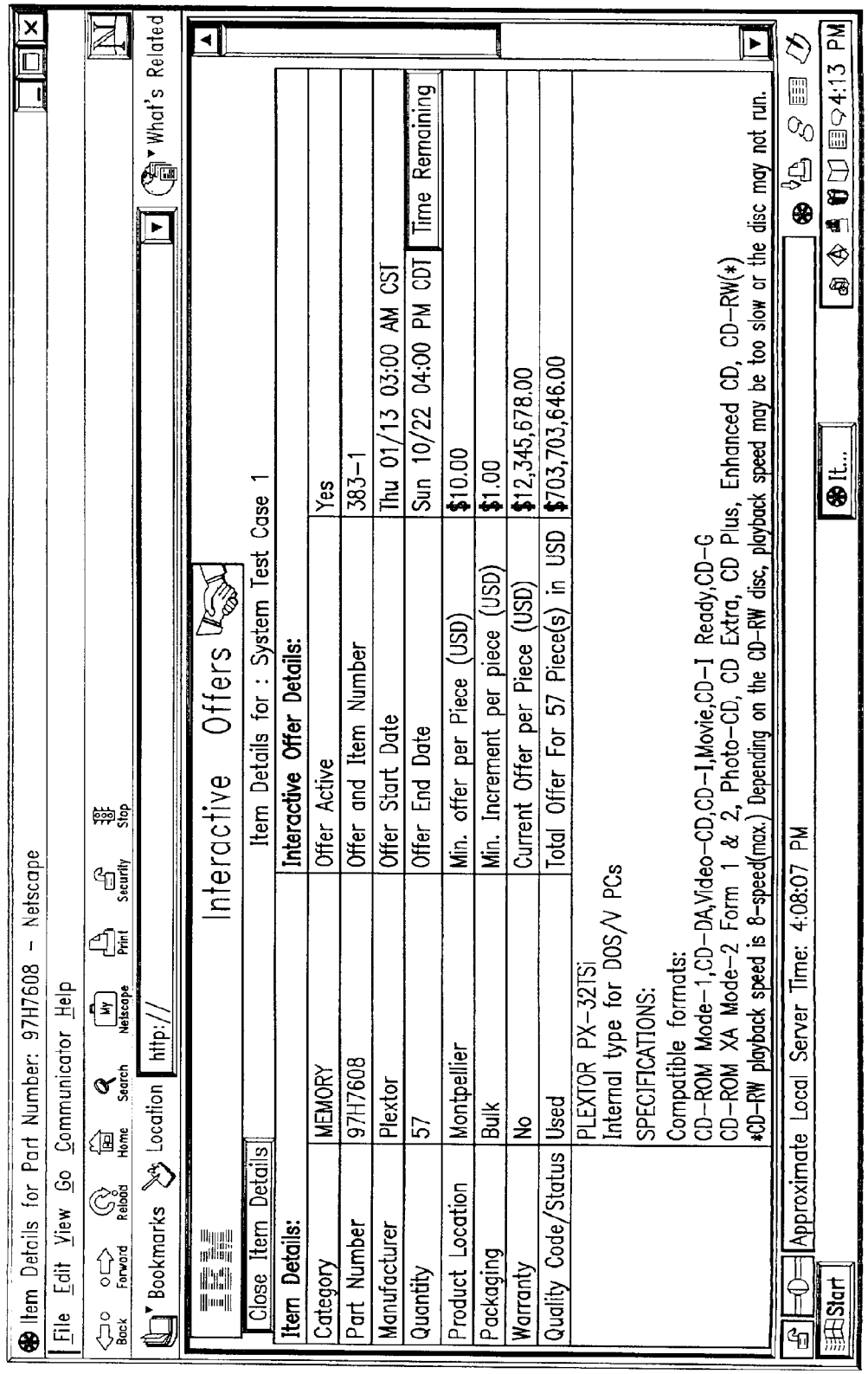
FIG. 9 depicts a screen image within which a local server clock and a time remaining icon is illustrated in accordance with the present invention.

FIG. 9 depicts a screen image within which a local server clock and a time remaining icon is illustrated in accordance with the present invention. The local server clock currently indicates the server time being 4:08:07 p.m.

Figure 10:
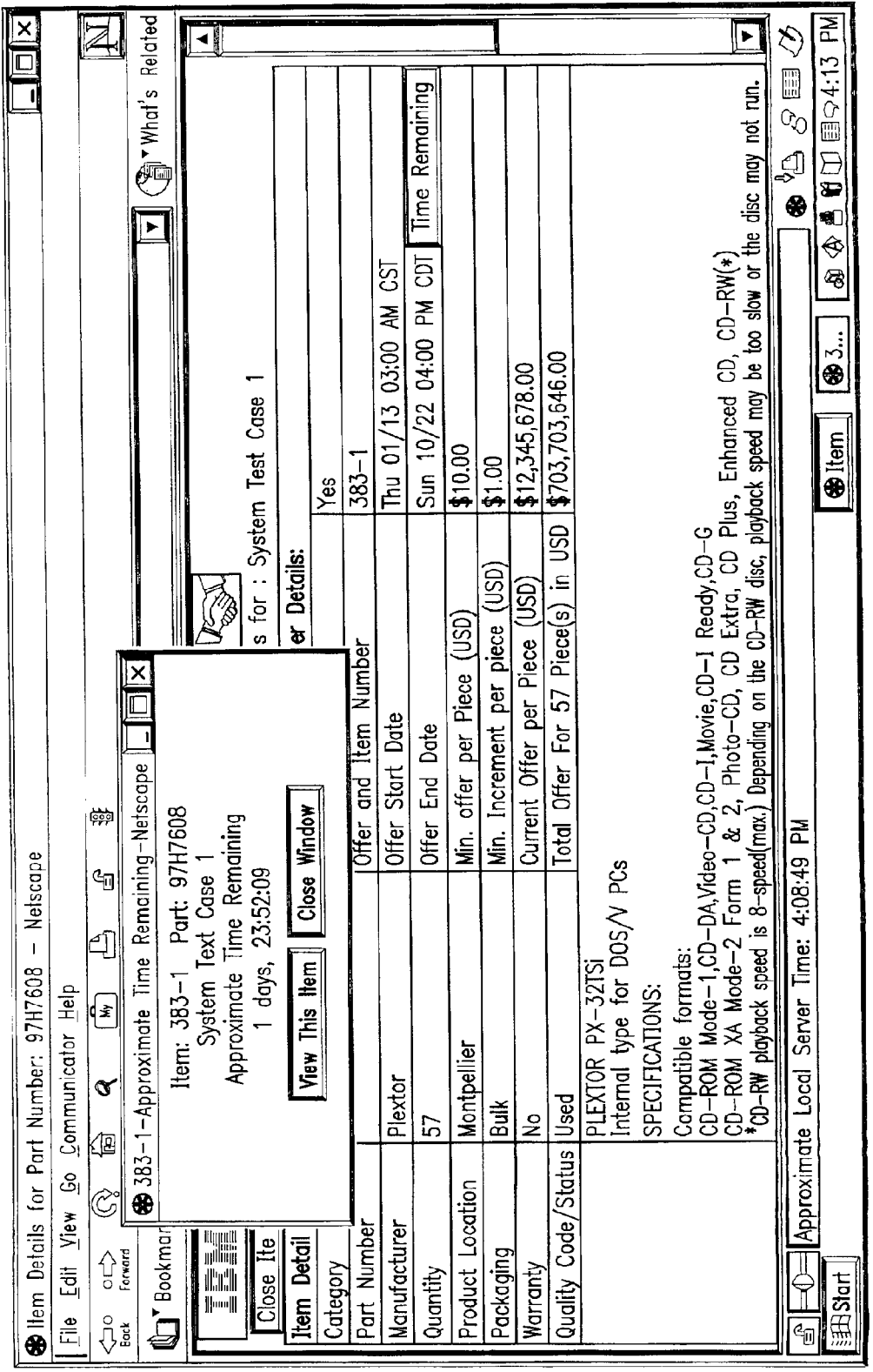
FIG. 10 depicts a screen image within which a local server clock and a time remaining counter is illustrated which is displayed in response to a selection of the time remaining icon of FIG. 9 when the time remaining is less than a specified parameter in accordance with the present invention.

FIG. 10 depicts a screen image within which a local server clock and a time remaining counter is illustrated which is displayed in response to a selection of the time remaining icon of FIG. 9 when the time remaining is less than a specified parameter in accordance with the present invention. The local server clock now indicates the server time being 4:08:49 p.m. The time remaining icon shown in FIG. 9 was selected and a time remaining window is now displayed. The time remaining before the close of the offer is currently less than 7 days. Therefore, the time remaining counter is displayed which will continue to count down to the close of the offer.

It will be understood by those skilled in the art and from the foregoing description that various modifications and changes may be made in the preferred embodiment of the present invention without departing from its spirit and scope. It is intended that this description is for purposes of illustration only and should not be construed in a limiting sense. The scope of this invention should be defined by the following claims.

What is claimed is:

1. A method in a data processing system including a server computer system, which includes a server clock, coupled to a client computer system, which includes a display and a client clock, for generating and displaying, in said client computer system, a local server clock which is synchronized with said server clock utilizing said client clock, said method comprising the steps of:

requesting data from said server computer system to be displayed on said client computer system's display;

receiving said data from said server computer system by said client computer system;

said client computer system determining a current time indicated by said server clock;

said client computer system generating a local server clock;

thereafter, updating said local server clock utilizing said client clock;

displaying said data and said local server clock together on said display;

establishing a refresh counter within said client computer system;

upon said request of said data, resetting said refresh counter to zero;

upon said receipt of said data in said client, incrementing said refresh counter; and displaying said refresh counter on said display along with said data.

2. The method according to claim 1, further comprising the steps of:

requesting a refresh of said data, wherein said data is retransmitted from said server to said client in response to said request;

resetting said refresh counter to zero in response to a receipt of said retransmitted data;

upon said receipt of said retransmitted data in said client, incrementing said refresh counter; and displaying said refresh counter on said display along with said retransmitted data.

3. A method in a data processing system including a server computer system, which includes a server clock, coupled to a client computer system, which includes a display and a client clock, for generating and displaying, in said client computer system, a local server clock which is synchronized with said server clock utilizing said client clock, said method comprising the steps of:

requesting data from said server computer system to be displayed on said client computer system's display;

receiving said data from said server computer system by said client computer system;

said client computer system determining a current time indicated by said server clock;

said client computer system generating a local server clock;

thereafter, updating said local server clock utilizing said client clock;

displaying said data and said local server clock together on said display;

wherein the step of requesting data from said server computer system to be displayed on said client computer system's display further comprising the step of requesting a Web page from said server computer system to be displayed on said client computer system's display;

including at least one auction item available for sale in said Web page;

displaying an icon associated with said at least one auction item, said auction item being available for sale until a particular date and time, said particular date and time being determined by said server clock;

selecting said icon;

determining an amount of time currently remaining until said particular date and time utilizing said local server clock;

displaying said amount of time in a window in response to a selection of said icon;

establishing a time-remaining counter;

displaying said amount of time utilizing said time-remaining counter in response to said display;

decrementing said time-remaining counter utilizing said client clock to count decrements;

opening said window in response to said selection of said icon;

resetting said time-remaining counter in response to said selection;

displaying a current value of said time-remaining counter in said window;

establishing a time-remaining parameter;

permitting a user to specify said time-remaining parameter;

in response to said determined amount of time being greater than or equal to said time-remaining parameter, displaying a statement indicating said determined amount of time is greater than said time-remaining parameter; and in response to said determined amount of time being less than said time-remaining parameter, displaying a current value of said time-remaining counter.

4. The method according to claim 3, further comprising the steps of:

closing said window; and stopping said time-remaining counter in response to said closing said window.

5. A data processing system including a server computer system, which includes a server clock, coupled to a client computer system, which includes a display and a client clock, for generating and displaying, in said client computer system, a local server clock which is synchronized with said server clock utilizing said client clock, comprising:

said client computer system for requesting data from said server computer system to be displayed on said client computer system's display;

said client computer system for receiving said data from said server computer system by said client computer system;

said client computer system for determining a current time indicated by said server clock;

said client computer system for generating a local server clock;

said client computer system for thereafter, updating said local server clock utilizing said client clock;

said data and said local server clock being displayed together on said display;

a refresh counter included within said client computer system;

upon said request of said data, said client computer system for resetting said refresh counter to zero;

upon said receipt of said data in said client, said client computer system for incrementing said refresh counter, and said display for displaying said refresh counter along with said data.

6. The system according to claim 5, further comprising the steps of:

said client computer system for requesting a refresh of said data, wherein said data is retransmitted from said server to said client in response to said request;

said refresh counter being reset to zero in response to a receipt of said retransmitted data;

upon said receipt of said retransmitted data in said client, said client computer system for incrementing said refresh counter; and said display for displaying said refresh counter along with said retransmitted data.

7. A data processing system including a server computer system, which includes a server clock, coupled to a client computer system, which includes a display and a client clock, for generating and displaying, in said client computer system, a local server clock which is synchronized with said server clock utilizing said client clock, comprising:

said client computer system for requesting data from said server computer system to be displayed on said client computer system's display;

said client computer system for receiving said data from said server computer system by said client computer system;

said client computer system for determining a current time indicated by said server clock;

said client computer system for generating a local server clock;

said client computer system for thereafter, updating said local server clock utilizing said client clock;

said data and said local server clock being displayed together on said display;

wherein said client computer system for requesting data from said server computer system to be displayed on said client computer system's display further comprising maid client for requesting a Web page from said server computer system to be displayed on said client computer system's display;

said server computer system for including at least one auction item available for sale in said Web page;

an icon associated with said at least one auction item being displayed with said at least one auction item, said auction item being available for sale until a particular date and time, said particular date and time being determined by said server clock;

said client for permitting selection of said icon;

said local server clock for determining an amount of time currently remaining until said particular date and time;

said amount of time being displayed in a window in response to a selection of said icon;

a time-remaining counter being displayed;

said amount of time being displayed utilizing said time-remaining counter in response to a display of said time-remaining counter;

said client computer system for decrementing said time-remaining counter utilizing said client clock to count decrements;

said window being opened in response to said selection of said icon;

said time-remaining counter being reset in response to said selection;

a current value of said time-remaining counter being displayed in said window;

a time-remaining parameter;

in response to said determined amount of time being greater than or equal to said time-remaining parameter, said window for displaying a statement indicating said determined amount of time is greater than said time-remaining parameter; and in response to said determined amount of time being less than said time-remaining parameter, said window for displaying a current value of said time-remaining counter.

8. The system according to claim 7, further comprising the stops of:

said window being closed; and said time-remaining counter being stopped in response to said closing of said window.

9. A computer readable medium in a data processing system including a server computer system, which includes a server clock, coupled to a client computer system, which includes a display and a client clock, for generating and displaying, in said client computer system, a local server clock which is synchronized with said server clock utilizing said client clock, said computer readable medium comprising:

instruction means for requesting data from said server computer system to be displayed on said client computer system's display;

instruction means for receiving said data from said server computer system by said client computer system;

instruction means for said client computer system determining a current time indicated by said server clock;

instruction means for said client computer system generating a local server clock;

instruction means for thereafter, updating said local server clock utilizing said client clock;

instruction means for displaying said data and said local server clock together on said display;

instruction means for establishing a refresh counter within said client computer system;

instruction means for upon said request of said data, resetting said refresh counter to zero;

instruction means for upon said receipt of said data in said client, incrementing said refresh counter; and instruction means for displaying said refresh counter on said display along with said data.

10. The computer readable medium according to claim 9, further comprising:

instruction means for requesting a refresh of said data, wherein said data is retransmitted from said server to said client in response to said request;

instruction means for resetting said refresh counter to zero in response to a receipt of said retransmitted data;

instruction means for upon said receipt of said retransmitted data in said client, incrementing said refresh counter; and instruction means for displaying said refresh counter on said display along with said retransmitted data.

11. A computer readable medium in a data processing system including a server computer system, which includes a server clock, coupled to a client computer system, which includes a display and a client clock, for generating and displaying, in said client computer system, a local server clock which is synchronized with said server clock utilizing said client clock, said computer readable medium comprising:

instruction means for requesting data from said server computer system to be displayed on said client computer system's display;

instruction means for receiving said data from said server computer system by said client computer system;

instruction means for said client computer system determining a current time indicated by said server clock;

instruction means for said client computer system generating a local server clock;

instruction means for thereafter, updating said local server clock utilizing said client clock;

instruction means for displaying said data and said local server clock together on said display;

wherein said instruction means for requesting data from said server computer system to be displayed on said client computer system's display further comprises instruction means for requesting a Web page from said server computer system to be displayed on said client computer system's display;

instruction means for including at least one auction item available for sale in said Web page;

instruction means for displaying an icon associated with said at least one auction item, said auction item being available for sale until a particular date and time, said particular date and time being determined by said server clock;

instruction means for selecting said icon;

instruction means for determining an amount of time currently remaining until said particular date and time utilizing said local server clock;

instruction means for displaying said amount of time in a window in response to a selection of said icon;

instruction means for establishing a time-remaining counter;

instruction means for displaying said amount of time utilizing said time-remaining counter in response to said display;

instruction means for decrementing said time-remaining counter utilizing said client clock to count decrements;

instruction means for opening said window in response to said selection of said icon;

instruction means for resetting said time-remaining counter in response to said selection;

instruction means for displaying a current value of said time-remaining counter in said window;

instruction means for establishing a time-remaining parameter;

instruction means for permitting a user to specify said time-remaining parameter;

instruction means for in response to said determined amount of time being greater than or equal to said time-remaining parameter, displaying a statement indicating said determined amount of time is greater than said time-remaining parameter; and instruction means for in response to said determined amount of time being less than said time-remaining parameter, displaying a current value of said time-remaining counter.

12. The computer readable medium according to claim 11, further comprising:

instruction means for closing said window; and instruction means for stopping said time-remaining counter in response to said closing said window.

\* \* \* \* \*

UNITED STATES PATENT AND TRADEMARK OFFICE
CERTIFICATE OF CORRECTION

PATENT NO. : 6,934,868 B2 Page 1 of 1
APPLICATION NO. : 09/751247
DATED : August 23, 2005
INVENTOR(S) : Morrison et al.

It is certified that error appears in the above-identified patent and that said Letters Patent is hereby corrected as shown below:

Col. 12, line 20: before "client" delete "maid" and insert --said--.

Col. 12, line 62: before "of" delete "stops" and insert --steps--.

Signed and Sealed this

Twenty-sixth Day of December, 2006

JON W. DUDAS
*Director of the United States Patent and Trademark Office*